Patented Mar. 8, 1938

2,110,273

UNITED STATES PATENT OFFICE 2,110,273

PROCESS OF CARRYING OUT ORGANIC ELECTROCHEMICAL REACTIONS

Ralph H. McKee, New York, N. Y., and Charles J. Brockman, Athens, Ga., assignors, by direct and mesne assignments, to The Calco Chemical Company, Inc., Bridgewater Township, Somerset County, New Jersey, a corporation of Delaware No Drawing. Application October 5, 1933, Serial No. 692,356

20 Claims. (Cl. 204—9)

This invention relates to an improved process of carrying out organic electrochemical reactions.

This application is a continuation-in-part of our copending application Serial No. 499,408, filed December 1, 1930.

The principal object of this invention is to provide an improved process of carrying out organic electrochemical reactions which is particularly adapted for use in reducing or oxidizing organic compounds which are insoluble or only slightly soluble in water.

An important object of the invention is to provide a process of reducing or oxidizing by electrochemical reaction organic compounds which are insoluble or only slightly soluble in water, wherein the use of ordinary organic solvents such as alcohol, acetone, benzol and the like, and the disadvantages attendant upon the use of such solvents, are avoided.

Other objects and advantages of the invention will become apparent during the course of the following description.

As is set forth in detail in "Electro-Organic Chemistry" by C. J. Brockman, (John Wiley & Sons, Inc.), there are in use at the present time two general methods for carrying out organic electrochemical reactions where the organic material to be changed, i. e. the depolarizer, is insoluble or only slightly soluble in water. According to one of these methods, the depolarizer is dissolved in an ordinary organic solvent such as alcohol, acetone, benzol or the like, and it is generally necessary to use with the solvent employed in carrying out the reaction a material, such for example as sulfuric acid, sodium hydroxide, or sodium acetate, which will conduct the electric current, since the solvents are generally poor conductors or nonconductors of the electric current. For example, experiments have been described in which nitrobenzene ($C_6H_5NO_2$) has been dissolved in 50 per cent. alcohol, to which mixture one-tenth of its volume of sulfuric acid has been added. At the cathode reduction takes place with production of aniline. In another experiment using nitrobenzene dissolved in 60 per cent. alcohol which was saturated with ammonium chloride, reduction took place with the formation of phenylhydroxylamine. For such experiments the voltage required is high, say 10 to 20 volts, the yield leaves much to be desired, and there is much loss of alcohol or other organic solvent due to evaporation since such electrolytic reactions are generally carried out at temperatures above 50° C.

Another general process used in the prior art for effecting such reactions is to carry them out by the use of an emulsification method. For example, nitrobenzene is suspended, but not dissolved, in an aqueous solution of ammonium chloride or other conducting salt solution by extremely vigorous stirring, with or without an emulsifying agent. Care has to be taken that the emulsifying agent itself is one not acted upon in the electrochemical reaction. Such a process depends upon bringing the organic material, in minute droplets, into contact with the electrode where the reduction or oxidation is taking place.

As indicated above, of the reactions which have been used successfully, practically all belong to the two classes mentioned and of these the far greater portion are reactions in which the depolarizer is reduced rather than oxidized. Of course, soluble depolarizers such as alcohol, acetone, aldehydes, acetic acid and the like have been both oxidized and reduced in considerable number. However, this is not true of the insoluble depolarizers with which we are here concerned and it is a purpose of this invention to provide a process for carrying out oxidizations and reductions in the large field of more complex organic chemistry, such as in the field of aromatic compounds, and these compounds are, in general, soluble in water only in traces.

We have discovered that the carrying out of organic electrochemical reactions with water insoluble depolarizers can be materially improved and the number of such reactions greatly increased by the use of an organic solvent consisting of a strong aqueous solution of a readily soluble metallic salt of an organic acid capable of dissolving and holding in solution substantial amounts of organic depolarizers which are insoluble in water or soluble only in traces. We prefer to use as the solvent a saturated aqueous solution of a readily soluble alkali-forming metal salt of an organic acid. Among the salts which provide solvents of the desired characteristics may be mentioned sodium paratoluene sulfonate, sodium cymene sulfonate, sodium benzoate, sodium benzene sulfonate, sodium sulfocyanate, sodium citrate, or other soluble salts of the corresponding acids. While the sodium salts are preferred the ammonium and potassium salts, for example, work equally well. In fact, any readily soluble metallic salts, including the alkaline earth salts, of organic acids may be used to provide solvents suitable for use in the practice of our process provided these salts are sufficiently soluble in water. While all of the various salts which may be employed do not provide solutions having equal solvent action on all of the organic compounds which may be treated in accordance with the invention, some compounds being more soluble in one salt solution than in another, they all provide solutions which exhibit marked solvent action on a wide variety of water insoluble compounds of the character referred to.

We have found that by employing a solvent of the character described it is possible to conduct electrochemical reactions successfully at a considerably higher temperature than is possible where volatile solvents, such as those customarily used, are employed. For example, we have demonstrated that temperatures of from 70 to 90° C. may be used in carrying out the reactions without such loss of solvents as would be the case if a solvent such as alcohol or acetone were used. The use of such temperatures lowers the voltage required and permits the use of higher current density. Another extremely important advantage in using a solvent of the character described is that the salt solution employed as the solvent is a good conductor of electricity, this apparently being the first case of an organic solvent which of itself is a good conductor of electricity. As a result of this fact it is not necessary to use with the solvent a material, such as sulfuric acid, as a conductor. Moreover, we have found that in carrying out organic electrochemical reactions with a solvent of the character described, materially lower voltages may be employed than are required in the former processes using ordinary organic solvents. For example, we have found that voltages of from 3 to 5 volts are effective but this voltage may, of course, be raised by diaphragm resistance. Another advantage resulting from the use of the new type of solvent is that excellent yields are obtained. In fact, repeated tests have demonstrated that almost theoretical yields are secured. Further, by the use of the new solvent, reactions can be carried out in either neutral, acid, or alkaline solution about the cathode or the anode and thereby the character of the product desired determined. For example, when nitrobenzene is reacted upon under alkaline cathode conditions, practically theoretical yields of azobenzene or hydrazobenzene, based on amperage used, are obtained. If the reaction is carried out under acid conditions aniline is produced. If benzyl alcohol is oxidized in strongly alkaline solution benzoic acid is the principal product formed while if the solution is neutral or mildly alkaline benzaldehyde is the principal product, benzoic acid being the secondary product.

In the practice of our process the depolarizer to be treated is dissolved in a strong solution of a highly soluble metallic salt of an organic acid and this solution introduced into an electrolytic cell which may be of the character commonly employed for carrying out electrochemical reactions. We prefer to employ an electrolytic cell of the type in which the anode is surrounded by a permeable diaphragm. Various forms of diaphragms may be employed but we have found that the simplest type of diaphragms, such as a sheet of porous paper, cloth, porous porcelain, alundum, or asbestos paper, works with complete satisfaction. It is ordinarily preferable to use a diaphragm with the lowest resistance for a particular material, but at the same time with the greatest mechanical strength and resistance to the chemicals present.

Where the depolarizer is to be reduced the anode of the cell may be advantageously made of lead and the cathode of a material which will not be affected by the chemicals present or formed in the electrolysis, for example a phosphor bronze wire gauze cathode. In place of lead as an anode when reducing reactions are being carried out, anodes of graphite, the noble metals, Duriron, and other conductors which are, in general, insoluble in the acid or salt present at the anode, may be employed. Instead of employing phosphor bronze gauze as the cathode the electrolytic cell may be provided with a cathode of nickel, copper, bronze, platinum, gold, lead or the like, either in gauze or in sheet form. Our preference is for these materials in gauze or sheet form so that there is much surface exposed to the solution carrying the material to be reduced. When oxidation reactions are to be carried out in the electrolytic cell, the anode of lead or other material suggested above should be replaced by an anode which will not be affected by any material present at the time of or formed by the electrolysis. Materials of the character suggested for use in making cathodes for reducing reactions may be used for making anodes when oxidation reactions are to be carried out, as will be apparent.

The actual steps of carrying out the electrolytic reactions are, in general, the same as in the present processes wherein volatile organic solvents are employed with the exception that higher temperatures may be used, voltages reduced, higher current densities used, and agitation often dispensed with. If desired, reaction catalysts may be employed to promote either oxidation or reduction. For example, catalysts such as cobalt, nickel, cerium, vanadium, or manganese may be employed in the anode chamber in oxidation reactions, and nickel, zinc, tin, cerium, lead, iron, or copper may be advantageously used in the cathode chamber in reduction reactions. Cerium and iron salts have hitherto been used as oxidation catalysts but this use in the catholyte as catalysts is, we believe, entirely new as is also the use of nickel and cobalt as oxidation catalysts in the anolyte. A typical example of our new method of carrying out electrolytic reactions is as follows:

*Example I.*—An approximately saturated neutral or alkaline solution of the sodium salt of paratoluene sulfonic acid is prepared. 100 cc. of such a solution will contain approximately 48 parts of the salt and 68 parts of water at 25° C. If a higher temperature is used, the salt is more soluble. To 100 cc. of such a solution, approximately 10 cc. of nitrobenzene are added and it is found that this material goes into solution immediately. As a matter of fact, a considerably greater amount of this material may be dissolved in the solvent at room temperature if desired. If the solution is saturated with the organic acid salt at still higher temperatures, it will, of course, dissolve increased amounts of nitrobenzene, which material, practically speaking, is insoluble in pure water.

The thus prepared solution containing nitrobenzene is placed in the cathode compartment of an electrolytic cell, preferably one in which the anode is surrounded by a permeable diaphragm as described above. In the anode compartment, the same organic acid salt solution can be used but it is preferable to use a solution of a simple salt such as sodium sulfate or an acid such as sulfuric acid or the acid whose salt solution is being used as catholyte. The cell is preferably provided with a lead anode and a bronze wire gauze cathode. A current of electricity is then passed through the cell until hydrogen is evolved from the cathode.

While the electric current can be passed at ordinary temperature, lower voltages and higher current density can be used if the contents of the cell are heated to a somewhat elevated temperature, say from 70 to 80° C. Under these conditions substantially no hydrogen appears at the cathode during the process of electrolysis, the hydrogen which would normally be set free by the electric current being used in the reduction of the depolarizer, i. e., nitrobenzene. During the electrolysis of the solution of nitrobenzene, the depolarizer is reduced to azobenzene, or, if alkaline, the azobenzene first produced is further reduced to hydrazobenzene. If the solution of nitrobenzene introduced into the cell is acid, aniline will be formed instead of azobenzene. When the electrolysis is complete as is shown by the evolution of hydrogen gas from the cathode, the current is stopped and the solution removed and cooled to room temperature. The azobenzene (or hydrazobenzene) crystallizes out, is filtered off, and after washing with water is found to be in practically pure state. The solvent solution can then be used to dissolve more nitrobenzene and returned to the cell for a second run.

*Example II.*—Orthonitroanisol was reduced in a concentrated aqueous solution of the mixed potassium and sodium salts of ordinary xylene sulfonic acid. 460 g. of the nitroanisol were dissolved in a liter of the neutral salt solution. 75 cc. of 18 normal caustic soda were added to give the desired alkalinity. A phosphor-bronze sheet cathode was used and inside the porous alundum cup employed as a diaphragm there was used as the anolyte an aqueous solution of xylene sulfonic acid. Temperature was 80° C. A current density of 3 amp. per sq. dm. was used until hydrogen began to be evolved (210 amp. at 6 volts), then the current density was reduced to 1 amp. and continued until hydrogen again started to evolve (55 amp. at 4.5 volts) when the current density was reduced again (0.5 amp.) and held at that density until the reduction was complete and hydrogen again began to be evolved (12 amp. at 4.1 volts). The total time of the electrolysis was 16.5 hours. On cooling and somewhat diluting the solution there was obtained a yield of 80% of the desired hydrazoanisol and 10% of anisidine, based on the nitroanisol taken. In the salt solution there remained small amounts of these materials not diluted out.

In other similar experiments using nitroanisol or other depolarizers catalysts were used. The addition of 1.5 g. of cerium sulfate or zinc sulfate per liter served to increase the efficiency of operation in that a larger amount of the current could be used at the high current density and hence the time of operation shortened. The yield of products was unchanged.

If, however, copper was used as a catalyst in the reduction of nitrobenzene and other compounds the percentage of amine was increased to about 50% and of the hydrazo compound decreased correspondingly.

The process can be made continuous by feeding continuously to a suitable cell such as that shown and described in the McKee Patent No. 1,408,618, issued March 7, 1922, a hot solution of nitrobenzene in a strong solution of a readily soluble metallic salt or an organic acid and continuously withdrawing the solution after it has been reduced, cooling it (if needed), filtering off the reduced product (azobenzene or hydrazobenzene) heating the filtrate, saturating the heated filtrate with nitrobenzene and returning it to the cell.

While in the first example recited the production of hydrazobenzene, azobenzene, and aniline from nitrobenzene as a depolarizer in the catholyte is described, the process may be used to prepare reduction products from numerous other depolarizers. For example, we have prepared corresponding compounds from orthonitrotoluene, paranitrotoluene, orthonitroanisol, paranitrochlorbenzene, alphanitronaphthalene and metanitrobenzene sulfonic acid. We have also produced benzoin from benzil and borneol from camphor. It will thus be seen that we have treated nitro compounds to produce amines (aniline) and aromatic azo compounds, such as azobenzene and its homologues, hydrazobenzenes; nitro sulfonic acids to produce azosulfonic acids; and ketones to produce secondary alcohols. In each case the yields were about 90 per cent. and in no case were appreciable amounts of other products formed. In still other cases the yields of the desired product have not been so good e. g., in the reduction of acetanilide and of aliphatic esters.

When depolarizers are used in the anolyte oxidation reactions occur, e. g., benzyl alcohol gives benzoic acid (sodium benzoate) if the solution is strongly alkaline, or benzaldehyde if approximately neutral; or benzaldehyde gives benzoic acid; or benzene gives phenol; or unsaturated fatty acids such as those from linseed oil give oxyacids; secondary alcohols give ketones, etc. Many of these oxidation reactions are speeded up by catalysts such as nickel, cobalt, cerium, or vanadium.

In the operation of the process it is sometimes desirable to use a solvent composed of water saturated with the organic acid salt at relatively high temperatures, for example 80 to 90° C. Such a solvent will dissolve considerable amounts of the depolarizer. Due to its being saturated at such high temperatures, if it is allowed to cool, large quantities of the organic acid salt present will crystallize out. In practicing the process this is avoided by diluting the solution after electrolysis but before cooling to such a point that the salt will not crystallize out when brought to room temperature. By this means the organic salt does not crystallize out but the product of electrolysis will crystallize out if it is a solid or precipitate out in drops if it is a liquid.

In some instances the product of electrolysis is itself relatively soluble in the solvent solution even at room temperature. In such case, the product can ordinarily be most advantageously recovered by diluting the solvent with water until it is no longer a solvent for the product. The product is then filtered off and the filtrate concentrated by evaporation to its original concentration when it is ready for reuse. In case the product of the electrolysis is soluble in water other methods common in the chemical industry may be used for separating it from the salt solution.

We have found that in many cases the process may be carried out without the use of a diaphragm as suggested above. In the case where a product is to be reduced in a cell not provided with a diaphragm the anode is made relatively small and the cathode quite large. Such a process has the advantage that the resistance of the cell is reduced to say 2.5 volts when the electrolysis occurs hot. The resistance due to the diaphragm is, of course, not existent under such conditions. The disadvantage of employing a cell without a diaphragm is that the material can never be completely reduced due to the simultaneous oxidation of a small portion of the reduced depolarizer at the anode. Moreover, it will be found that a diaphragm is necessary when employing certain of the solvents mentioned above as catholytes since there is some oxidation of the organic part of the solvent itself with production of undesirable by-products when the cell is used without a diaphragm. This is not true in the case of other of the solvents mentioned and such solvents may be used in cells without a diaphragm, although it is preferable generally to employ the diaphragm.

While the process has been particularly described with reference to reduction reactions it is applicable to oxidizing organic materials. For example, we have treated a solution of benzene in an organic acid salt solution of the type described to produce phenol by oxidation. The oxidation of toluene gave the first reaction on the side-chain. However, we have found that the process is particularly advantageous in carrying out reduction reactions and its use for such purpose is particularly recommended.

While, as indicated above, the present process is particularly adapted for carrying out reduction reactions with water insoluble depolarizers, it will be understood that the invention is not limited to this preferred embodiment of the invention, and that the process is applicable to the altering of the chemical composition of any organic compounds capable of alteration by electrochemical reaction, e. g., simultaneous chlorination and reduction of a nitro compound to give chloramines. Of course, it will be understood that the process would not be applicable to the altering of a chemical which had already been fully altered by reaction. For example, it would not be applicable to the reduction of an organic compound which had already been reduced.

As set forth above, the present process involves the use as solvents for organic depolarizers of strong solutions of readily soluble metallic salts of organic acids. While we have specifically mentioned several different salts which we have found particularly suitable for use in the practice of the present process, it will be understood that the present invention is not limited to these particular salts, or to any particular chemical class or classes of organic salts, since any metallic salt of an organic acid may be used to provide solvents suitable for use in the practice of our process provided it is readily soluble in water. By "readily soluble" is meant the solubility of the salt is greater than fifty parts in a hundred in water at room temperature.

In the subjoined claims where a depolarizer is referred to as insoluble, the term insoluble signifies that the solubility is less than about one part in a hundred in water at room temperature.

While we have described in detail the preferred practice of our process and the preferred materials for use in connection therewith it is to be understood that the details of procedure and the materials used may be widely varied without departing from the spirit of the invention or the scope of the subjoined claims.

We claim:

1. In a process of altering by electrochemical reaction the chemical composition of a substantially water insoluble organic depolarizer, the improvement which comprises dissolving said depolarizer in a strong aqueous solution of a readily soluble metallic salt of an organic acid, said solution being sufficiently concentrated so that the depolarizer can be dissolved therein to form a true solution free from particles of the depolarizer present in a discrete phase, introducing such solution into an electrolytic cell, and passing an electric current through such cell.

2. In a process of reducing by electrochemical reaction a substantially water insoluble organic depolarizer, the improvement which comprises dissolving said depolarizer in a strong aqueous solution of a readily soluble metallic salt of an organic acid, said solution being sufficiently concentrated so that the depolarizer can be dissolved therein to form a true solution free from particles of the depolarizer present in a discrete phase, bringing such solution into contact with the cathode of an electrolytic cell, and passing an electric current through such cell.

3. In a process of reducing by electrochemical reaction a substantially water insoluble organic depolarizer, the improvement which comprises dissolving said depolarizer in a strong aqueous solution of an alkali metal salt of an organic acid, said solution being sufficiently concentrated so that the depolarizer can be dissolved therein to form a true solution free from particles of the depolarizer present in a discrete phase, bring such solution into contact with the cathode of an electrolytic cell, and passing an electric current through such cell.

4. In a process of oxidizing by electrochemical reaction a substantially water insoluble organic depolarizer, the improvement which comprises dissolving said depolarizer in a strong solution of a readily aqueous soluble metallic salt of an organic acid, said solution being sufficiently concentrated so that the depolarizer can be dissolved therein to form a true solution free from particles of the depolarizer present in a discrete phase, bringing such solution into contact with the anode of an electrolytic cell, and passing an electric current through such cell.

5. In a process of oxidizing by electrochemical reaction a substantially water insoluble organic depolarizer, the improvement which comprises dissolving said depolarizer in a strong aqueous solution of an alkali metal salt of an organic acid, said solution being sufficiently concentrated so that the depolarizer can be dissolved therein to form a true solution free from particles of the depolarizer present in a discrete phase, bringing such solution into contact with the anode of an electrolytic cell, and passing an electric current through such cell.

6. In a process of altering by electrochemical reaction the chemical composition of a substantially water insoluble organic depolarizer comprising a hydrocarbon compound, the improvement which comprises dissolving such hydrocarbon compound in a strong aqueous solution of a readily soluble metallic salt of an organic acid said solution being sufficiently concentrated so that the depolarizer can be dissolved therein to form a true solution free from particles of the depolarizer present in a discrete phase, introducing such solution into an electrolytic cell, and passing an electric current through such cell.

7. In a process of oxidizing by electrochemical reaction a substantially water insoluble organic depolarizer comprising a hydrocarbon compound, the improvement which comprises dissolving such compound in a strong aqueous solution of a readily soluble metallic salt of an organic acid, said solution being sufficiently concentrated so that the depolarizer can be dissolved therein to form a true solution free from particles of the depolarizer present in a discrete phase, bringing such solution into contact with the anode of an electrolytic cell, and passing an electric current through such cell.

8. In a continuous process of altering by electrochemical reaction the chemical composition of a depolarizer comprising a substantially water insoluble organic compound, the improvement which comprises dissolving such compound in a strong aqueous solution of a readily soluble metallic salt of an organic acid, said solution being sufficiently concentrated so that the depolarizer can be dissolved therein to form a true solution free from particles of the depolarizer present in a discrete phase, moving a current of such solution through an electrolytic cell while passing an electric current through such cell, withdrawing the solution from the cell after the completion of the reaction, removing the reaction product produced from such solution and treating the solution with additional amounts of the organic compound to be reacted upon in the further practice of the process.

9. In a continuous process of reducing by electrochemical reaction a depolarizer consisting of a substantially water insoluble organic compound, the improvement which comprises dissolving such compound in a strong aqueous solution of a readily soluble metallic salt of an organic acid, said solution being sufficiently concentrated so that the depolarizer can be dissolved therein to form a true solution free from particles of the depolarizer present in a discrete phase, moving a current of such solution in contact with the cathode of an electrolytic cell while passing an electric current through such cell, withdrawing the solution from the cell after reduction is completed, cooling the withdrawn solution, filtering off the reduced product heating the filtrate, saturating the filtrate with additional amounts of the insoluble organic compound to be reduced, and returning such solution in a moving current to the cell.

10. In a process of altering by electrochemical reaction the chemical composition of a substantially water insoluble organic depolarizer, the improvement which comprises dissolving such compound in a substantially saturated aqueous solution of a readily soluble alkali-forming metal salt of an aromatic acid, introducing such solution into an electrolytic cell, and passing an electric current through such cell.

11. In a process of reducing by electrochemical reaction a substantially water insoluble organic depolarizer, the improvement which comprises dissolving such compound, in a substantially saturated aqueous solution of a readily soluble alkali-forming metal salt of an aromatic acid, bringing such solution into contact with the cathode of an electrolytic cell, and passing an electric current through such cell.

12. In a process of reducing by electrochemical reaction a depolarizer consisting of a substantially water insoluble aromatic nitro compound, the improvement which comprises dissolving the aromatic nitro compound under treatment in a substantially saturated aqueous solution of a readily soluble alkali-forming metal salt of an aromatic acid, bringing such solution into contact with the cathode of an electrolytic cell, and passing an electric current through such cell.

13. In a process of oxidizing by electrochemical reaction a substantially water insoluble organic depolarizer the improvement which comprises dissolving such compound in a substantially saturated aqueous solution of a readily soluble alkali-forming metal salt of an aromatic acid, bringing such solution into contact with the anode of an electrolytic cell, and passing an electric current through such cell.

14. In a process of altering by electrochemical reaction the chemical composition of a substantially insoluble organic depolarizer, the improvement which comprises dissolving such depolarizer in a strong aqueous solution of a readily soluble metallic salt of an organic acid, said solution being sufficiently concentrated so that the depolarizer can be dissolved therein to form a true solution free from particles of the depolarizer present in a discrete phase, introducing such solution into an electrolytic cell in the presence of a catalyst, and passing an electric current through such cell.

15. In the reduction of an organic compound by electrochemical reaction in aqueous solution, the improvement which comprises including in the catholyte a reduction catalyst consisting of cerium compound.

16. In the oxidation of an organic compound by electrochemical reaction, the improvement which comprises including in the anolyte an oxidation catalyst selected from the group consisting of nickel and cobalt.

17. In a process of reducing by electrochemical reaction an aromatic nitro compound substantially insoluble in water to a hydrazo compound, the improvement which comprises dissolving the nitro compound in a strong aqueous solution of a readily soluble metallic salt of an organic acid, the strength of the solution being sufficient so that the aromatic nitro compound dissolves to form a true solution free from particles of the compound in a discrete phase, adjusting the solution to the desired alkalinity, bringing the solution into contact with the cathode of an electrolytic cell and passing an electric current through said cell.

18. In a process of reducing by electrochemical reaction nitrobenzene to hydrazobenzene, the improvement which comprises dissolving the nitro compound in a strong aqueous solution of a readily soluble metallic salt of an organic acid, the strength of the solution being sufficient so that the nitrobenzene dissolves to form a true solution free from particles of the compound in a discrete phase, adjusting the solution to the desired alkalinity, bringing the solution into contact with the cathode of an electrolytic cell and passing an electric current through said cell.

19. In a process of reducing by electrochemical reaction orthonitroanisol to hydrazoanisol, the improvement which comprises dissolving the nitroanisol in a strong aqueous solution of a readily soluble metallic salt of an organic acid, the strength of the solution being sufficient so that the orthonitroanisol dissolves to form a true solution free from particles of the compound in a discrete phase, adjusting the solution to the desired alkalinity, bringing the solution into contact with the cathode of an electrolytic cell and passing an electric current through said cell.

20. In a process of reducing by electrochemical reaction nitrotoluene to hydrazotoluene, the improvement which comprises dissolving the nitrotoluene in a strong aqueous solution of a readily soluble metallic salt of an organic acid, the strength of the solution being sufficient so that the nitrotoluene dissolves to form a true solution free from particles of the compound in a discrete phase, adjusting the solution to the desired aklalinity, bringing the solution into contact with the cathode of an electrolytic cell and passing an electric current through said cell.

RALPH H. McKEE.
CHARLES J. BROCKMAN.

CERTIFICATE OF CORRECTION.

Patent No. 2,110,273.    March 8, 1938.

RALPH H. MCKEE, ET AL.

It is hereby certified that error appears in the printed specification of the above numbered patent requiring correction as follows: Page 2, second column, line 55, for "anoloyte" read anolyte; page 4, second column, line 49, claim 4, strike out the word "aqueous" and insert the same after "strong" in line 48, same claim; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.

solution free from particles of the compound in a discrete phase, adjusting the solution to the desired alkalinity, bringing the solution into contact with the cathode of an electrolytic cell and passing an electric current through said cell.

20. In a process of reducing by electrochemical reaction nitrotoluene to hydrazotoluene, the improvement which comprises dissolving the nitrotoluene in a strong aqueous solution of a readily soluble metallic salt of an organic acid, the strength of the solution being sufficient so that the nitrotoluene dissolves to form a true solution free from particles of the compound in a discrete phase, adjusting the solution to the desired aklalinity, bringing the solution into contact with the cathode of an electrolytic cell and passing an electric current through said cell.

RALPH H. McKEE.
CHARLES J. BROCKMAN.

CERTIFICATE OF CORRECTION.

Patent No. 2,110,273.     March 8, 1938.

RALPH H. MCKEE, ET AL.

It is hereby certified that error appears in the printed specification of the above numbered patent requiring correction as follows: Page 2, second column, line 55, for "anoloyte" read anolyte; page 4, second column, line 49, claim 4, strike out the word "aqueous" and insert the same after "strong" in line 48, same claim; and that the said Letters Patent should be read with these corrections therein that the same may conform to the record of the case in the Patent Office.

Signed and sealed this 3d day of May, A. D. 1938.

(Seal)     Henry Van Arsdale,
Acting Commissioner of Patents.

CERTIFICATE OF CORRECTION.

Patent No. 2,110,273.   March 8, 1938.

RALPH H. MCKEE, ET AL.

It is hereby certified that error appears in the printed specification of the above numbered patent requiring correction as follows: Page 2, second column, line 55, for "anoloyte" read anolyte; page 4, second column, line 49, claim 4, strike out the word "aqueous" and insert the same after "strong" in line 48, same claim; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.